United States Patent [19]

Hoffmann

[11] Patent Number: 4,694,681
[45] Date of Patent: Sep. 22, 1987

[54] MEASURING TURBINE

[75] Inventor: Helmuth Hoffmann, Bergisch-Gladbach, Fed. Rep. of Germany

[73] Assignee: Hydrotechnik GmbH, Fed. Rep. of Germany

[21] Appl. No.: 748,033

[22] Filed: Jun. 24, 1985

Related U.S. Application Data

[63] Continuation of Ser. No. 602,758, Apr. 23, 1984, abandoned, which is a continuation of Ser. No. 364,480, Apr. 1, 1982, abandoned.

[30] Foreign Application Priority Data

Apr. 1, 1981 [DE] Fed. Rep. of Germany ....... 3113112

[51] Int. Cl.$^4$ .............................................. G01F 1/12
[52] U.S. Cl. ....................................... 73/3; 73/861.33
[58] Field of Search ........... 73/861.83, 861.77, 861.78, 73/861.79, 861.81, 3

[56] References Cited

U.S. PATENT DOCUMENTS

| 3,143,882 | 8/1964 | Brueckner | 73/861.78 |
|---|---|---|---|
| 3,177,710 | 4/1965 | Faure-Herman | 73/861.83 |
| 3,329,021 | 7/1967 | Quesinberry et al. | 73/861.79 |
| 3,364,743 | 1/1968 | Clinton | 73/861.77 |
| 3,550,426 | 12/1970 | Griffo | 73/861.77 |
| 3,636,767 | 1/1972 | Duffy | 73/861.77 |
| 3,822,591 | 7/1974 | Li | 73/861.81 |
| 4,132,453 | 1/1979 | Burrus et al. | 73/861.83 |
| 4,161,879 | 7/1979 | Dunne, Jr. | 73/861.81 |
| 4,316,392 | 2/1923 | Leber | 73/861.63 |

Primary Examiner—Herbert Goldstein
Attorney, Agent, or Firm—Robert J. Koch

[57] ABSTRACT

A measuring turbine with a turbine rotor arranged in a flow channel of the measuring housing comprises a turbine rotor and an inductive pulse pickup, wherein between the wall of the housing of the flow channel and the circumference of the turbine rotor an annular gap with an irregular configuration is present. The housing wall opposite the turbine rotor of the flow channel has at least one bore hole with a variable effective depth. The inductive measuring sensor is arranged in the bore, whereby the depth of insertion may be adjusted.

8 Claims, 4 Drawing Figures

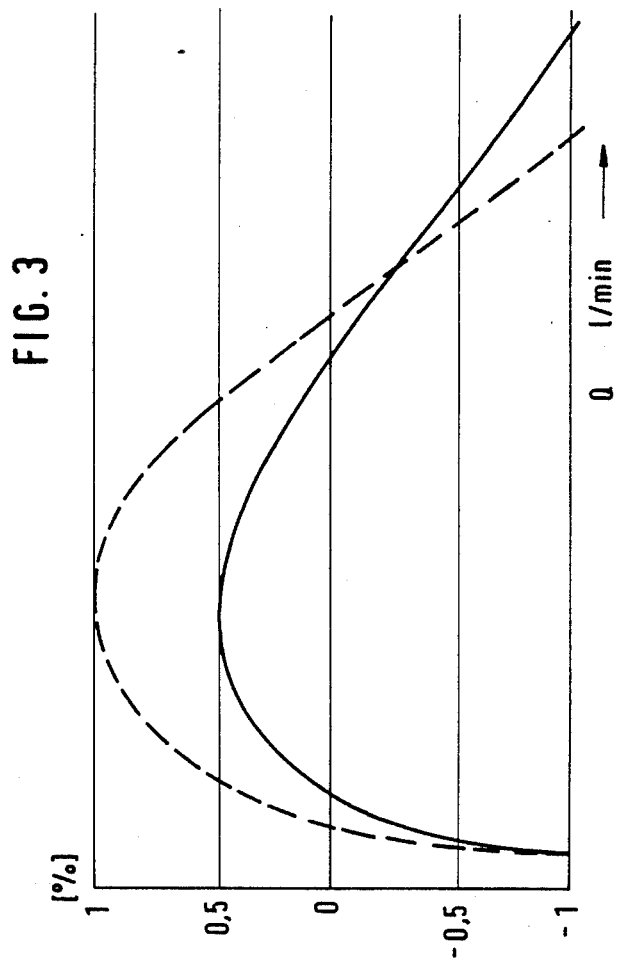

MEASURING TURBINE

This is a continuation of application Ser. No. 602,758 filed Apr. 23, 1984, now abandoned, which is a continuation of application Ser. No. 364,480 filed Apr. 1, 1982, now abandoned.

BACKGROUND OF THE INVENTION

1. Field of the Invention

The invention concerns a measuring turbine with a turbine rotor arranged in a flow channel of the measuring housing. The turbine rotor is positioned such that its axis is in the direction of the flow. The turbine rotor is also equipped with an inductive pulse pickup.

2. Background of the Prior Art

Flow meters of this type are known per se and belong to the group of the intermediate volume counters operating on the principle of the so-called Woltmann impeller wheel counter and being particularly suitable for the accurate measurement of the instantaneous volume flow of fluids. A turbine rotor with a low mass centeringly located in a tubular body is exposed to flow in the axial direction with the medium to be measured impacting the turbine disk in the form of a quasi laminar flow after having been quieted by means of flow rectifiers. The rpm of the turbine disk is proportional to the mean flow velocity and thus corresponds over a broad range to the volume passing through.

The rpm of the turbine disk is preferably taken off with a low reaction force through the non-magnetic tubular body by means of an inductive transducer. The number of pulses per unit time is proportional to the instantaneous volume flow, while even in the case of the minimum volume flow, the rpm of the turbine disk is not affected by the inductive pulse takeoff. However, hydraulic losses are dependent on viscosity and are functions of the Reynolds number, respectively.

By selecting high quality, low friction bearing materials and by reducing the impeller mass, efforts have been made to keep the braking torque as low as possible in order to preserve a maximum effect, i.e., a broad measuring range of the counter or expansion of the measuring range. This affects the characteristic of the error curve. Such measures, however, largely depend on the angle of the blades to the axis of the turbine disk and on the number of blades, whereby the circumferential velocity of the impeller wheel is also affected.

Attempts to make the known turbine flow meters into an accurately operating measuring instrument have led over the course of time to improvements concerning the configuration of the impellers.

There are known configurations with two different slopes, for example, wherein a steeper slope is used in the forward part of the disk than in the rear part. This results in the fact that in the case of small flow volumes the impact is more intensive so that even with flow volumes, rpm ranges are attained whereby the lower limit of the measuring range may be lowered. In order, however, to avoid reaching excessively high rpm ranges leading to increased wear, the rear part of the impeller disk is given with a less steep slope, thereby providing for the necessary equalization of velocity.

The reduction of the rpm of the impeller disk in the range of relatively low flows affects the characteristic of the error curve so that the latter may be maintained flatter, thereby making it possible to either reduce the error limit or to expand the measuring range, depending on whether the zero limit is to be shifted or its position maintained without change.

During the measuring process, the housing wall surrounding the turbine disk affects the rotating motion of the turbine. The fluid to be measured is at rest immediately adjacent to the wall, while on the circumference of the turbine disk high rpms of the fluid are attained. There is also, therefore, a relative movement of the flow medium in the circumferential direction of the turbine disk. If the circumferential velocity component of this flow is affected by suitable means, the existing rpm of the turbine disk is also altered.

It is known from the mathematical fundamentals indicating the qualitative relationship of turbine disk counters, that the slip of the turbine rotor decreases with the square of the flow. This type of slip occurs, for example, during the rotation of cylinders in housings with a narrow gap, but also during the rotation of blades in the vicinity of housing walls. It is known to utilize both processes in the construction of so-called viscosity compensated turbine disk counters. The flow in this instance is within the so-called laminar turbulent range with a slip effect of $1/Re$, wherein $Re$ is the Reynolds number.

Other effects are, however, superposed on the effect declining with the square of the volume flow of this slip, so that in actual practice there is a negative slope of the error curve (see the broken curve in FIG. 3 following the maximum).

SUMMARY OF THE INVENTION

It is, therefore, an object of the invention to reduce the maximum of the error curve by means of an additional, defined and variable slip provided with properties similar to those described hereinabove of the turbine rotor. By the provision of such a slip, the rpm of a turbine rotor may be affected so that, as set forth hereinabove, either the proportional deviation of the error characteristic may be improved or the measuring range extended in the direction of higher volume flows.

It is, therefore, a further object of the invention to provide means whereby a defined and variable additional slip may be produced.

The objects of the invention are attained according to the aforementioned measuring turbine wherein the annular gap between the wall of the flow channel housing and the circumference of the turbine rotor has an irregular configuration. This renders it possible to brake the velocity component in the circumferential direction generated by the flow through of the turbine rotor, thereby reducing the rpm of the turbine rotor.

This may be effected according to the invention, for example, by arranging the rotor axis of the turbine rotor eccentrically with respect to the flow.

In a further embodiment of the invention, the housing wall of the flow channel has an irregular configuration over the circumference of the turbine rotor. For this purpose, one embodiment provides a plurality of guide shapes in the housing wall of the flow channel opposite the turbine rotor, extending longitudinally in the direction of the turbine axis. The flow guide shapes here consist of baffle plates, beads or axial grooves. A combination of the different flow guide shapes is also possible.

In another embodiment of the invention, the wall of the housing opposite the turbine rotor is equipped with at least one bore hole having a variable effective depth. An induction measuring detector is arranged advantageously in the bore. The detector has a variable screw range in depth.

BRIEF DESCRIPTION OF THE DRAWINGS

The invention shall become more apparent from an embodiment illustrated in detail in the drawings attached hereto.

In the drawing:

FIG. 3 shows the characteristic error curve according to the present invention compared to an error curve of a corresponding measuring instrument according to the state of the art.

FIG. 1 shows a measuring turbine in a longitudinal section approximately in its actual size. The measuring housing 14 surrounds a round flow channel 15 and is equipped on the input side with an inlet 16 and on the discharge side with an outlet 17, and discharge connector 56. The inlet and outlet connectors are both equipped with threads. The arrow 13 indicates the direction of flow of the flow medium to be measured. Immediately following the inlet connection, a flow rectifier 18 is located in the flow channel 15. The flow rectifier comprises six baffle plates in the embodiment exemplified. Each baffle plate is fastened to a ring 30 on the inlet side and simultaneously serves as the holder for the rotor axle 2. In order to reduce the formation of vortices, a flow form 19 precedes the rotor axle 2. Further flow forms 20, 21 and 22 are located in front and after the rotor disk 4 and at the outlet end of the axle 2. The flow form 20 has a configuration, such that the fluid flowing against the rotor disk is directed into the range of the rotor blades. The flow form 21 is followed immediately by a further baffle arrangement 23, also serving to rectify the flow.

Figure 1:
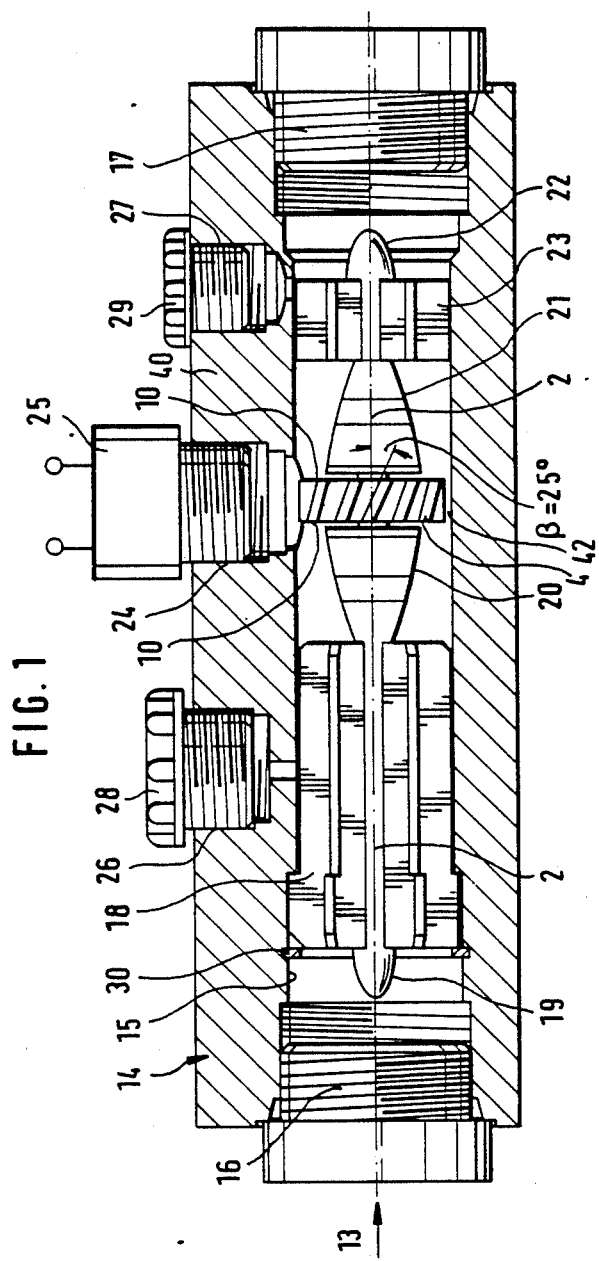
FIG. 1 shows a longitudinal section through a measuring turbine.

Bore holes 26 and 27 are present in the housing 14 to receive suitable pressure and temperature transducers. These holes may be closed off by means of the caps 28 and 29. The openings of the transducer bores are located in the inlet area of the flow rectifiers 18 and 23 so that they have no appreciable effect on the turbine rotor 4.

The housing wall 40 of the flow channel 15 has a bore 24, arranged opposite the turbine rotor 4. An inductive measuring detector 25 (also referred to as an inductive pulse pickup) is located in the bore 24. The depth of insertion of inductive measuring detector 25 is variable.

Figure 2A:
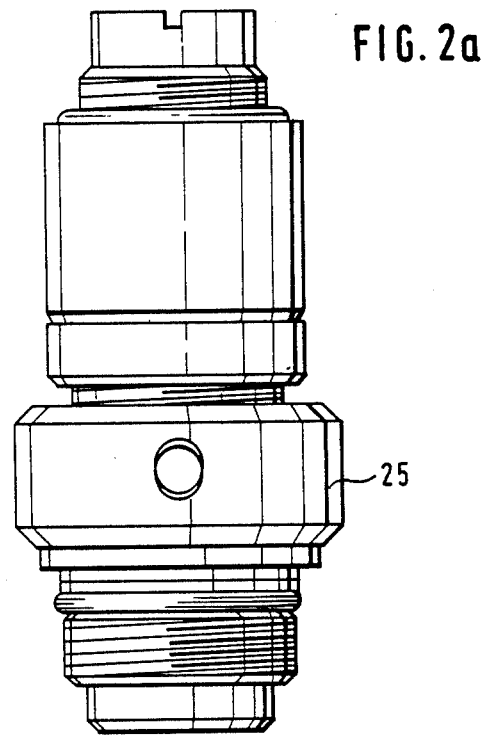
FIG. 2a illustrates a cross section through an inductive sensor with its screw insert.
Figure 2B:
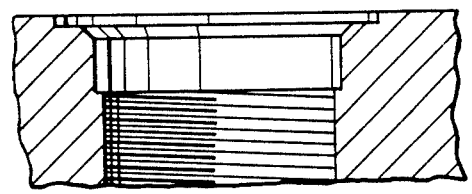
FIG. 2b illustrates a cross section through a bore hole in the measuring housing to receive the insert of the inductive sensor.

An illustrative type of inductive sensor (measuring detector) 25 is shown in FIG. 2a, while FIG. 2b illustrates the bore 24 of FIG. 1 in the wall 40 on an enlarged scale.

FIG. 3 shows the characteristic error curve (solid line) of the device of this invention in a comparison with the corresponding error curve of a measuring turbine of the state of the art (broken line). As clearly indicated by the configuration of the curve, the maximum of the error curve may be substantially reduced by varying the depth of insertion of the inductive sensor 25. The reduction of the maximum of the error curve is the greatest when the bore 24 has attained its maximum effective depth by means of the outward rotation of the inductive sensor. By the presence of the bore 24 in the housing wall 40, braking forces acting eccentrically on the turbine rotor are generated. With increasing rpm of the turbine disk, the shear gradient forming in the annular space 42 (see FIG. 1) also increases. A braking action as a function of the rpm of the turbine rotor is effected, specifically by the production of corresponding vortices which in turn again depend on the rpm. Consequently, the greater the braking action on the disk of the turbine rotor, the more the original maximum rpm of the turbine rotor disk will be reduced. This is clearly seen in FIG. 3 from the onset of the curve to its maximum. The braking effect thus acts to reduce the proportional deviation, for example, from +1% to +0.5%. If, for example, an identical deviation of 1% is accepted, the zero line may be shifted, so that the measuring range may be extended in the direction of higher flow volumes. If, for example, it is not necessary to increase the measuring range, the accuracy of the measuring turbine may be improved by reducing the proportional deviation, as shown in FIG. 3.

By means of the rotation of the measuring detector 25 and thus the variation of the effective depth on the bore 24, adjustments or calibrations of the measuring instrument may be effected. The zero line may be established in this manner once the deviation of the error characteristic is known. The accuracy or the configuration of the error characteristic with respect to its maximum may now be varied as desired by the corresponding adjustment of the inductive measuring sensor 25.

The specification and drawings set forth preferred embodiments of the invention. It should be noted, however, that the invention is not limited to those specific embodiments and methods specifically disclosed, but extends instead to all embodiments, substitute and equivalent constructions falling within the scope of the invention as defined by the claims.

What is claimed is:

1. A turbine for measuring the flow within a flow channel housing:
    a flow channel housing;
    a turbine rotor arranged in the flow channel with its axis in the direction of flow and defining an annular gap between the outer circumference of the tubular rotor and the inner housing surface;
    an inductive pulse detector mounted in said flow channel housing adjacent to said outer circumference of said turbine rotor;
    means for providing an irregular configuration to said annular gap to produce a controlled braking of a velocity component in the circumferential direction of said turbine rotor generated by a flow through said turbine rotor, comprising a bore formed in the flow channel housing enlarging said annular gap by the area of said bore; and
    means for adjusting said controlled braking comprising means for varying the depth of said bore.

2. The turbine of claim 1, wherein said means for providing an irregular configuration further comprises an irregularly shaped housing wall in an area adjacent to the outer circumference of said turbine rotor.

3. The turbine of claim 1, wherein said means for providing an irregular configuration further comprises said turbine rotor mounted eccentrically in said flow channel.

4. The turbine of claim 1, 2 or 3 further comprising a plurality of flow guides extending in the direction of the turbine axis adjacent said turbine rotor.

5. The turbine of claim 4 wherein said flow guides comprise members selected from the group consisting of baffle plates, longitudinal beads and axial grooves.

6. The turbine of claim 1, wherein said means for providing an irregular configuration further comprises an adjustable bore filler member arranged in a bore hole in said housing.

7. The turbine of claim 1, wherein said means for providing an irregular configuration further comprises an adjustable bore filler member arranged in a housing bore hole wherein said inductive pulse detector is adjustably arranged in said bore hole.

8. A process for adjusting the rotation of a turbine rotor in a measuring turbine wherein said turbine rotor is arranged in a flow channel with its axis in the direction of flow, comprising:
- providing an irregular configuration of an annular gap defined by the circumference of the turbine rotor and a flow channel wall to produce braking forces on a circumferential flow component around said turbine rotor;
- varying the irregular configuration of said flow channel wall to adjust said braking to an optimum desired level.

* * * * *